United States Patent
Meier et al.

(10) Patent No.: US 8,608,053 B2
(45) Date of Patent: Dec. 17, 2013

(54) MOBILE COMMUNICATION TERMINAL CONFIGURED TO DISPLAY MULTI-SYMBOL DECODABLE INDICIA

(75) Inventors: Timothy Meier, Camillus, NY (US); Timothy Williams, Northport, NY (US); Stephen Patrick Deloge, Palmyra, NY (US)

(73) Assignee: Honeywell International Inc., Fort Mill, SC (US)

( * ) Notice: Subject to any disclaimer, the term of this patent is extended or adjusted under 35 U.S.C. 154(b) by 0 days.

(21) Appl. No.: 13/459,833

(22) Filed: Apr. 30, 2012

(65) Prior Publication Data

US 2013/0284801 A1   Oct. 31, 2013

(51) Int. Cl.
*G06F 17/00* (2006.01)

(52) U.S. Cl.
USPC ......................................................... 235/375

(58) Field of Classification Search
USPC ......................................................... 235/375
See application file for complete search history.

(56) References Cited

U.S. PATENT DOCUMENTS

| | | |
|---|---|---|
| 4,091,270 A | 5/1978 | Musch et al. |
| 4,358,761 A | 11/1982 | Iwasaki |
| 4,654,514 A | 3/1987 | Watson et al. |
| 4,667,087 A | 5/1987 | Quintana |
| 4,721,849 A | 1/1988 | Davis et al. |
| 4,761,544 A | 8/1988 | Poland |
| 4,774,715 A | 9/1988 | Messenger |
| 4,825,058 A | 4/1989 | Poland |
| 4,841,132 A | 6/1989 | Kajitani et al. |
| 4,864,302 A | 9/1989 | Bowers |
| 4,868,375 A | 9/1989 | Blanford |
| 4,868,376 A | 9/1989 | Lessin et al. |
| 4,945,216 A | 7/1990 | Tanabe et al. |
| 4,964,167 A | 10/1990 | Kunizawa et al. |
| 5,046,066 A | 9/1991 | Messenger et al. |
| 5,101,406 A | 3/1992 | Messenger et al. |
| 5,120,943 A | 6/1992 | Benz et al. |
| 5,166,499 A | 11/1992 | Holland et al. |
| 5,185,514 A | 2/1993 | Wike, Jr. et al. |
| 5,206,881 A | 4/1993 | Messenger et al. |
| 5,208,449 A | 5/1993 | Eastman et al. |
| 5,256,865 A | 10/1993 | Wike, Jr. et al. |
| 5,317,136 A | 5/1994 | Hasegawa et al. |
| 5,347,113 A | 9/1994 | Reddersen et al. |
| 5,389,917 A | 2/1995 | LaManna et al. |
| 5,450,491 A | 9/1995 | McNair |
| 5,488,223 A | 1/1996 | Austin et al. |
| 5,510,606 A | 4/1996 | Worthington et al. |
| 5,532,692 A | 7/1996 | Tatsuya et al. |
| 5,557,095 A | 9/1996 | Clark et al. |
| 5,579,487 A | 11/1996 | Meyerson et al. |
| 5,594,493 A | 1/1997 | Nemirofsky |
| 5,602,377 A | 2/1997 | Beller et al. |

(Continued)

*Primary Examiner* — Daniel Hess
*Assistant Examiner* — Steven J Malone
(74) *Attorney, Agent, or Firm* — Additon, Higgins, Pendleton & Ashe, P.A.

(57) ABSTRACT

A mobile communication terminal can comprise a housing, a microprocessor disposed within the housing, a display incorporated into the housing, and a communication interface communicatively coupled to the microprocessor. The mobile communication terminal can be configured, responsive to receiving a byte sequence representing a character string containing one or more alphanumeric or non-alphanumeric characters, to encode the byte sequence into one or more bar code symbols having a minimum dimension of a smallest element equaling or exceeding a readability threshold value. The mobile communication terminal can be further configured to display the bar code symbols.

12 Claims, 7 Drawing Sheets

(56) References Cited

U.S. PATENT DOCUMENTS

| | | | |
|---|---|---|---|
| 5,610,595 A | 3/1997 | Garrabrant et al. |
| 5,640,001 A | 6/1997 | Danielson et al. |
| 5,640,684 A | 6/1997 | Konosu et al. |
| 5,644,601 A | 7/1997 | Kawaguchi |
| 5,646,389 A | 7/1997 | Bravman et al. |
| 5,668,803 A | 9/1997 | Tymes et al. |
| 5,744,788 A | 4/1998 | Metlitsky et al. |
| 5,748,904 A | 5/1998 | Huang et al. |
| 5,754,587 A | 5/1998 | Kawaguchi |
| 5,764,774 A | 6/1998 | Liu |
| 5,777,315 A | 7/1998 | Wilz et al. |
| 5,789,732 A | 8/1998 | McMahon et al. |
| 5,793,903 A | 8/1998 | Lopresti et al. |
| 5,794,145 A | 8/1998 | Milam |
| 5,802,179 A | 9/1998 | Yamamoto et al. |
| 5,804,802 A | 9/1998 | Card et al. |
| 5,805,779 A | 9/1998 | Christopher et al. |
| 5,815,811 A | 9/1998 | Pinard et al. |
| 5,818,032 A | 10/1998 | Sun et al. |
| 5,837,986 A | 11/1998 | Barile et al. |
| 5,837,987 A | 11/1998 | Koenck et al. |
| 5,838,720 A | 11/1998 | Morelli |
| 5,841,121 A | 11/1998 | Koenck |
| 5,848,064 A | 12/1998 | Cowan |
| 5,859,970 A | 1/1999 | Pleso |
| 5,869,819 A | 2/1999 | Knowles et al. |
| 5,900,613 A | 5/1999 | Koziol et al. |
| 5,905,251 A | 5/1999 | Knowles |
| 5,912,921 A | 6/1999 | Warren et al. |
| 5,924,040 A | 7/1999 | Trompower |
| 5,930,393 A | 7/1999 | Ho et al. |
| 5,938,726 A | 8/1999 | Reber et al. |
| 5,939,699 A | 8/1999 | Perttunen et al. |
| 5,940,595 A | 8/1999 | Reber et al. |
| 5,945,660 A | 8/1999 | Nakasuji et al. |
| 5,946,344 A | 8/1999 | Warren et al. |
| 5,956,863 A | 9/1999 | Allen |
| 5,973,681 A | 10/1999 | Tanigawa et al. |
| 5,986,651 A | 11/1999 | Reber et al. |
| 5,992,752 A | 11/1999 | Wilz, Sr. et al. |
| 5,995,105 A | 11/1999 | Reber et al. |
| 6,012,638 A * | 1/2000 | Ackley et al. ............ 235/462.01 |
| 6,026,397 A | 2/2000 | Sheppard et al. |
| 6,027,024 A | 2/2000 | Knowles |
| 6,045,048 A | 4/2000 | Wilz, Sr. et al. |
| 6,068,188 A | 5/2000 | Knowles |
| 6,072,401 A | 6/2000 | Kumar |
| 6,119,944 A | 9/2000 | Mulla et al. |
| 6,138,915 A | 10/2000 | Danielson et al. |
| 6,147,767 A | 11/2000 | Petteruti et al. |
| 6,149,059 A | 11/2000 | Ackley |
| 6,176,427 B1 | 1/2001 | Antognini et al. |
| 6,178,426 B1 | 1/2001 | Klein et al. |
| 6,182,897 B1 | 2/2001 | Knowles et al. |
| 6,186,406 B1 * | 2/2001 | Ackley .......................... 235/494 |
| 6,199,044 B1 | 3/2001 | Ackley et al. |
| 6,206,286 B1 | 3/2001 | Watanabe et al. |
| 6,208,980 B1 | 3/2001 | Kara |
| 6,307,487 B1 | 10/2001 | Luby |
| 6,321,986 B1 * | 11/2001 | Ackley .................... 235/462.01 |
| 6,321,989 B1 | 11/2001 | Wilz, Sr. et al. |
| 6,321,991 B1 | 11/2001 | Knowles |
| 6,321,992 B1 | 11/2001 | Knowles et al. |
| 6,343,101 B1 | 1/2002 | Dong et al. |
| 6,345,764 B1 | 2/2002 | Knowles |
| 6,347,743 B2 | 2/2002 | Wilz, Sr. et al. |
| 6,384,744 B1 | 5/2002 | Philyaw et al. |
| 6,389,010 B1 | 5/2002 | Kubler et al. |
| 6,412,699 B1 | 7/2002 | Russell et al. |
| 6,422,476 B1 | 7/2002 | Ackley |
| 6,507,856 B1 | 1/2003 | Chen et al. |
| 6,507,864 B1 | 1/2003 | Klein et al. |
| 6,525,835 B1 | 2/2003 | Gulati |
| 6,529,146 B1 | 3/2003 | Kowalski et al. |
| 6,535,493 B1 | 3/2003 | Lee et al. |
| 6,539,360 B1 | 3/2003 | Kadaba |
| 6,539,422 B1 | 3/2003 | Hunt et al. |
| 6,540,140 B1 | 4/2003 | Knowles et al. |
| 6,540,142 B1 | 4/2003 | Alleshouse |
| 6,565,005 B1 | 5/2003 | Wilz et al. |
| 6,568,596 B1 | 5/2003 | Shaw |
| 6,616,056 B2 | 9/2003 | Cato |
| 6,622,919 B1 | 9/2003 | Wilz et al. |
| 6,655,593 B2 | 12/2003 | Alleshouse |
| 6,681,994 B1 | 1/2004 | Koenck |
| 6,697,805 B1 | 2/2004 | Choquier et al. |
| 6,758,403 B1 | 7/2004 | Keys et al. |
| 6,764,009 B2 | 7/2004 | Melick et al. |
| 6,764,011 B2 | 7/2004 | Entani |
| 6,772,947 B2 | 8/2004 | Shaw |
| 6,776,342 B1 | 8/2004 | Thuries et al. |
| 6,823,388 B1 | 11/2004 | Philyaw et al. |
| 6,854,651 B2 | 2/2005 | Smith et al. |
| 6,860,427 B1 | 3/2005 | Schmidt et al. |
| 6,873,435 B1 | 3/2005 | Tehranchi et al. |
| 6,889,903 B1 | 5/2005 | Koenck |
| 6,902,114 B2 | 6/2005 | Hashimoto et al. |
| 6,908,034 B2 | 6/2005 | Alleshouse |
| 6,969,002 B2 | 11/2005 | Creamer et al. |
| 6,976,062 B1 | 12/2005 | Denby et al. |
| 6,987,927 B1 | 1/2006 | Battaglia et al. |
| 7,055,737 B1 | 6/2006 | Tobin et al. |
| 7,055,746 B2 * | 6/2006 | MacKay et al. ......... 235/462.04 |
| 7,075,676 B2 | 7/2006 | Owen |
| 7,104,452 B2 | 9/2006 | Trifilo |
| 7,114,021 B2 | 9/2006 | Seshadri |
| 7,159,214 B2 | 1/2007 | Rajaram et al. |
| 7,207,491 B2 | 4/2007 | Lubow |
| 7,337,317 B2 | 2/2008 | Meggitt et al. |
| 7,367,514 B2 | 5/2008 | Soule, III et al. |
| 7,475,823 B2 | 1/2009 | Brock et al. |
| 7,568,623 B2 | 8/2009 | Retter et al. |
| 7,680,705 B2 | 3/2010 | Healy et al. |
| 7,798,417 B2 * | 9/2010 | Snyder et al. ................. 235/494 |
| 7,905,409 B2 * | 3/2011 | Bybell et al. ............. 235/462.01 |
| 7,918,397 B2 | 4/2011 | Hussey |
| 7,942,328 B2 * | 5/2011 | Snyder et al. ............. 235/462.01 |
| 7,967,211 B2 * | 6/2011 | Challa et al. ............. 235/462.46 |
| 8,231,054 B1 * | 7/2012 | Kim ............................. 235/437 |
| 8,256,673 B1 * | 9/2012 | Kim ............................. 235/437 |
| 8,282,001 B2 * | 10/2012 | Snyder et al. ............. 235/462.01 |
| 2001/0043273 A1 | 11/2001 | Herrod et al. |
| 2001/0051915 A1 | 12/2001 | Ueno et al. |
| 2002/0066095 A1 | 5/2002 | Yu |
| 2002/0066788 A1 | 6/2002 | Knowles |
| 2002/0070278 A1 | 6/2002 | Hung et al. |
| 2002/0074404 A1 * | 6/2002 | Drumm .................... 235/462.01 |
| 2002/0081038 A1 | 6/2002 | Moule |
| 2002/0111924 A1 | 8/2002 | Lewis |
| 2002/0150245 A1 | 10/2002 | Sugimoto et al. |
| 2003/0024990 A1 | 2/2003 | Wilz et al. |
| 2003/0042312 A1 * | 3/2003 | Cato ........................ 235/462.25 |
| 2003/0048882 A1 | 3/2003 | Smith |
| 2003/0136841 A1 | 7/2003 | Alleshouse |
| 2003/0173405 A1 | 9/2003 | Wilz, Sr. et al. |
| 2003/0197062 A1 | 10/2003 | Shaw |
| 2003/0228063 A1 | 12/2003 | Nakayama et al. |
| 2003/0230630 A1 * | 12/2003 | Whipple et al. ......... 235/462.01 |
| 2004/0002943 A1 | 1/2004 | Merrill et al. |
| 2004/0003388 A1 | 1/2004 | Jacquemot et al. |
| 2004/0149826 A1 | 8/2004 | Alleshouse |
| 2004/0194081 A1 | 9/2004 | Qumei et al. |
| 2005/0082370 A1 * | 4/2005 | Frantz et al. ............. 235/462.25 |
| 2005/0171868 A1 | 8/2005 | Healy et al. |
| 2006/0060652 A1 | 3/2006 | Trifilo |
| 2006/0196950 A1 * | 9/2006 | Kiliccote ...................... 235/494 |
| 2006/0248524 A1 | 11/2006 | Seely |
| 2006/0255149 A1 * | 11/2006 | Retter et al. ............. 235/462.41 |
| 2007/0071320 A1 | 3/2007 | Yada |
| 2007/0145138 A1 * | 6/2007 | Snyder et al. ............. 235/462.01 |
| 2007/0272756 A1 * | 11/2007 | Brock et al. .............. 235/462.25 |
| 2008/0017722 A1 * | 1/2008 | Snyder et al. .................. 235/494 |
| 2008/0099561 A1 * | 5/2008 | Douma ........................ 235/454 |
| 2008/0125162 A1 | 5/2008 | Schraven et al. |

(56) References Cited

U.S. PATENT DOCUMENTS

| | | |
|---|---|---|
| 2008/0197193 A1 | 8/2008 | Overhultz et al. |
| 2008/0308638 A1* | 12/2008 | Hussey .................. 235/462.11 |
| 2009/0108080 A1* | 4/2009 | Meyer et al. ................. 235/494 |
| 2009/0200386 A1* | 8/2009 | Longacre, Jr. ............... 235/494 |
| 2009/0204522 A1* | 8/2009 | Meyer et al. ................... 705/34 |
| 2011/0000958 A1* | 1/2011 | Herzig ........................ 235/375 |
| 2011/0040624 A1* | 2/2011 | Jhanji ...................... 705/14.57 |
| 2011/0233285 A1* | 9/2011 | Meyer et al. ................. 235/494 |
| 2012/0067943 A1* | 3/2012 | Saunders et al. ............. 235/375 |
| 2012/0241516 A1* | 9/2012 | Zuleeg ......................... 235/375 |
| 2012/0274970 A1* | 11/2012 | Cok .............................. 358/1.14 |
| 2012/0282905 A1* | 11/2012 | Owen ........................ 455/414.1 |
| 2012/0284130 A1* | 11/2012 | Lewis et al. ..................... 705/16 |
| 2012/0284593 A1* | 11/2012 | Rodriguez ..................... 715/201 |
| 2012/0290418 A1* | 11/2012 | Itwaru ............................ 705/16 |

\* cited by examiner

MOBILE COMMUNICATION TERMINAL CONFIGURED TO DISPLAY MULTI-SYMBOL DECODABLE INDICIA

FIELD OF THE INVENTION

The present invention relates generally to mobile communication terminals, and in particular to mobile communication terminals configured to display decodable indicia.

BACKGROUND OF THE INVENTION

Mobile communication terminals equipped with displays (such as smartphones, mobile phones, personal digital assistants, etc.) are widely used for displaying decodable indicia, for example, airline boarding passes, coupons, loyalty program cards, etc. However, successful decoding of displayed decodable indicia significantly depends upon the minimum dimension of the smallest element of the decodable indicia, which in turn is dependent upon the symbol size and the screen resolution.

SUMMARY OF THE INVENTION

In one embodiment, there is provided a mobile communication terminal comprising a housing, a microprocessor disposed within the housing, a display incorporated into the housing, and a communication interface communicatively coupled to the microprocessor. The mobile communication terminal can be configured, responsive to receiving a byte sequence representing a character string containing one or more alphanumeric or non-alphanumeric characters, to encode the byte sequence into one or more bar code symbols having a minimum dimension of a smallest element equaling or exceeding a readability threshold value. The mobile communication terminal can be further configured to display the bar code symbols.

In a further aspect, the bar code symbols can be provided by a multi-symbol sequence, and at least one bar code symbol can include an indicator of an ordinal number of the bar code symbol in the multi-symbol sequence.

In a further aspect, the mobile communication terminal can be further configured to repeatedly display the multi-symbol sequence for a pre-defined period of time or a pre-defined number of cycles.

In a further aspect, the mobile communication terminal can be further configured to accept a user input selecting the readability threshold value. Alternatively, the mobile communication terminal can be further configured to determine the readability threshold value prior to encoding the byte sequence into the bar code symbols. In some embodiments, the mobile communication terminal can be further configured to determine the readability threshold value based on the display pixel resolution, the battery charge level, and/or the color scheme of the decodable indicia.

In a further aspect, the mobile communication terminal can further comprise an encoded information reading (EIR) device provided by a bar code reading device, an RFID reading device, and/or a card reading device. The wherein the EIR device can be configured to output raw message data containing an encoded message and/or output decoded message data corresponding to an encoded message.

In a further aspect, the mobile communication terminal can be provided by an EIR terminal, a smart phone, a mobile phone, a personal digital assistant (PDA), or other mobile communication device.

In a further aspect, the communication interface can be provided by a wireless communication interface.

In another embodiment, there is provided a mobile communication terminal comprising a housing, a microprocessor disposed within the housing, a display incorporated into the housing, and a communication interface communicatively coupled to the microprocessor. The mobile communication terminal can be configured, responsive to receiving a byte sequence representing an image of decodable indicia, to determine a minimum dimension of a smallest element of the decodable indicia. The mobile communication terminal can be further configured, responsive to ascertaining that the minimum dimension is less than a readability threshold value, to decode the decodable indicia into a character string containing one or more alphanumeric or non-alphanumeric characters and encode the character string into one or more bar code symbols having a minimum dimension of a smallest element equaling or exceeding the readability threshold value. The mobile communication terminal can be further configured to display the bar code symbols on the display.

In a further aspect, the bar code symbols can be provided by a multi-symbol sequence, and at least one bar code symbol can include an indicator of an ordinal number of the bar code symbol in the multi-symbol sequence.

In a further aspect, the mobile communication terminal can be further configured to repeatedly display the multi-symbol sequence for a pre-defined period of time or a pre-defined number of cycles.

In a further aspect, the mobile communication terminal can be further configured to accept a user input selecting the readability threshold value. Alternatively, the mobile communication terminal can be further configured to determine the readability threshold value prior to encoding the byte sequence into the bar code symbols. In some embodiments, the mobile communication terminal can be further configured to determine the readability threshold value based on the display pixel resolution, the battery charge level, and/or the color scheme of the decodable indicia.

In a further aspect, the mobile communication terminal can further comprise an encoded information reading (EIR) device provided by a bar code reading device, an RFID reading device, and/or a card reading device. The wherein the EIR device can be configured to output raw message data containing an encoded message and/or output decoded message data corresponding to an encoded message.

In a further aspect, the mobile communication terminal can be provided by an EIR terminal, a smart phone, a mobile phone, a personal digital assistant (PDA), or other mobile communication device.

In a further aspect, the communication interface can be provided by a wireless communication interface.

In another embodiment, there is provided a mobile communication terminal comprising a housing, a microprocessor disposed within the housing, a display incorporated into the housing, a display adapter communicatively coupled to the microprocessor, a video memory configured to store data representing images displayed by the display, and a communication interface communicatively coupled to the microprocessor. The mobile communication terminal can be configured, responsive to detecting a byte sequence representing an image of decodable indicia being transferred to the video memory, to determine a minimum dimension of a smallest element of the decodable indicia. The mobile communication terminal can be further configured, responsive to ascertaining that the minimum dimension is less than a readability threshold value, to decode the decodable indicia into a character string containing one or more alphanumeric or non-alphanumeric characters and encode the character string into one or more bar code symbols having a minimum dimension of a smallest element equaling or exceeding the readability threshold value. The mobile communication terminal can be further configured to display the bar code symbols on the display.

In a further aspect, the video memory can be configured to store a plurality of color values corresponding to a plurality of pixels displayed by the display.

In a further aspect, the mobile communication terminal can be configured to receive the byte sequence from an external computer. Alternatively, the mobile communication terminal can be configured to generate the byte sequence based on a message received from an external computer.

In a further aspect, the bar code symbols can be provided by a multi-symbol sequence, and at least one bar code symbol can include an indicator of an ordinal number of the bar code symbol in the multi-symbol sequence.

In a further aspect, the mobile communication terminal can be further configured to repeatedly display the multi-symbol sequence for a pre-defined period of time or a pre-defined number of cycles.

In a further aspect, the mobile communication terminal can be further configured to accept a user input selecting the readability threshold value. Alternatively, the mobile communication terminal can be further configured to determine the readability threshold value prior to encoding the byte sequence into the bar code symbols. In some embodiments, the mobile communication terminal can be further configured to determine the readability threshold value based on the display pixel resolution, the battery charge level, and/or the color scheme of the decodable indicia.

In a further aspect, the mobile communication terminal can further comprise an encoded information reading (EIR) device provided by a bar code reading device, an RFID reading device, and/or a card reading device. The wherein the EIR device can be configured to output raw message data containing an encoded message and/or output decoded message data corresponding to an encoded message.

In a further aspect, the mobile communication terminal can be provided by an EIR terminal, a smart phone, a mobile phone, or a personal digital assistant (PDA).

In a further aspect, the communication interface can be provided by a wireless communication interface.

In a yet another embodiment, there is provided a method of displaying decodable indicia by a mobile communication terminal. The method can comprise the steps of receiving a character string containing one or more alphanumeric or non-alphanumeric characters, encoding the character string into one or more bar code symbols having a minimum dimension of a smallest element equaling or exceeding a readability threshold value, and displaying the bar code symbols.

In some embodiments, the method can further comprise the step of accepting a user input selecting the readability threshold value. Alternatively, the method can further comprise the step of determining the readability threshold value prior to the step of encoding the byte sequence into the bar code symbols.

In a further aspect, the bar code symbols can be provided by a multi-symbol sequence, and at least one bar code symbol can include an indicator of an ordinal number of the bar code symbol in the multi-symbol sequence.

In a further aspect, the step of displaying can comprise repeatedly displaying the multi-symbol sequence for a pre-defined period of time or a pre-defined number of cycles.

In a yet another embodiment, there is provided a method of displaying decodable indicia by a mobile communication terminal. The method can comprise the steps of determining a minimum dimension of a smallest element of the decodable indicia, decoding the decodable indicia into a character string containing one or more alphanumeric or non-alphanumeric characters responsive to ascertaining that the minimum dimension is less than a pre-defined readability threshold value, encoding the character string into one or more bar code symbols having a minimum dimension of a smallest element equaling or exceeding the pre-defined readability threshold value, and displaying the bar code symbols.

In some embodiments, the method can further comprise the step of accepting a user input selecting the readability threshold value. Alternatively, the method can further comprise the step of determining the readability threshold value prior to the step of encoding the byte sequence into the bar code symbols.

In a further aspect, the bar code symbols can be provided by a multi-symbol sequence, and at least one bar code symbol can include an indicator of an ordinal number of the bar code symbol in the multi-symbol sequence.

In a further aspect, the step of displaying can comprise repeatedly displaying the multi-symbol sequence for a pre-defined period of time or a pre-defined number of cycles.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale, emphasis instead generally being placed upon illustrating the principles of the invention. In the drawings, like numerals are used to indicate like parts throughout the various views.

DETAILED DESCRIPTION OF THE INVENTION

There is provided a mobile communication terminal equipped with a display. The mobile communication terminal can be provided, e.g., by a mobile phone. Alternatively, the mobile communication terminal can be provided by a smart phone. In a yet another embodiment, the mobile communication terminal can be provided by a personal digital assistant (PDA). In a further embodiment, the mobile communication terminal can be provided by an encoded information reading (EIR) terminal adapted, e.g., to read and decode bar codes.

The mobile communication terminal described herein can be used for displaying decodable indicia, for example, airline boarding passes, coupons, loyalty program cards, etc. The readability of decodable indicia displayed by mobile communication terminals can be affected by a number of factors, the most prominent factor probably being the minimum dimension of the smallest element of the decodable indicia (e.g. of a bar code symbol). In the art of bar codes, the width of the smallest element is often referred to as X-dimension. Optical indicia readability problems can arise when a relatively large bar code symbol is displayed on a relatively small display having a high resolution, and thus a relatively small pixel size, which can lead to the X dimension of displayed bar code symbols becoming too small to be adequately resolved by the optical reader employed to read the bar code symbol, which in turn can lead to the optical reader either struggling or failing to obtain a decodable image of the bar code symbol.

Figure 1:
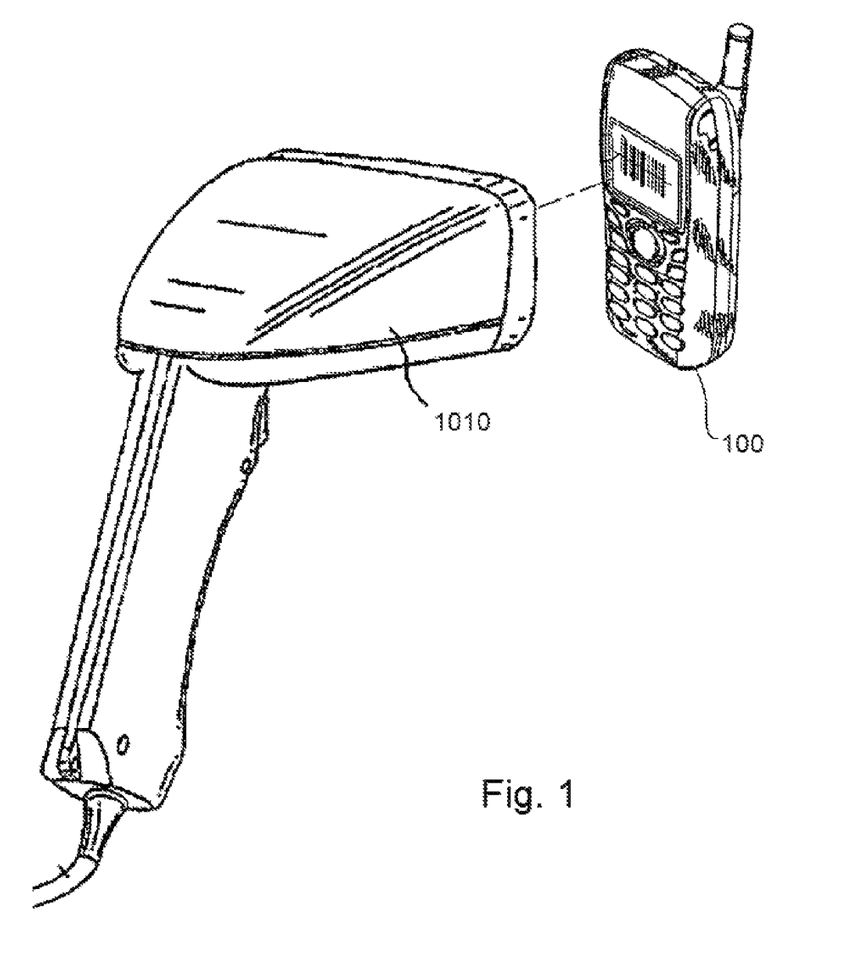
FIG. 1 schematically illustrates a bar code reader operated to read the optical decodable indicia displayed by a mobile communication terminal.

To overcome the above described readability issues, there is in one embodiment provided mobile communication terminal equipped with a display. The mobile communication terminal can be operated to display decodable indicia (e.g., bar codes) based on a byte sequence received via a communication interface (e.g., a wireless communication interface). FIG. 1 schematically illustrates a bar code reader 1010 operated to read the optical decodable indicia displayed by a mobile communication terminal 100.

To increase the readability of displayed decodable indicia, a mobile communication terminal can be configured to encode a character string containing one or more alphanumeric or non-alphanumeric characters (e.g., a content of an airline boarding pass, a coupon, or a loyalty program card) into one or more bar code symbols with X-dimension equaling or exceeding a pre-defined or dynamically calculated readability threshold value. For further increasing the readability, when more than one bar code symbol has been encoded as a sequence, the sequence of bar code symbols can be displayed repeatedly for a pre-defined period of time or a pre-defined number of cycles.

A character string can be encoded into multiple bar codes using a structured append feature. A "structured append" herein shall refer to an ability of a machine readable symbology to support multiple-symbol encoded messages, and use a control character(s) indicating that a symbol is a part of a multi-symbol sequence. In one embodiment, a character string encoded in a bar code symbol can include two or more control characters indicating the ordinal number of the message in a multi-message sequence, and the total number of messages in the sequence.

Figure 2:
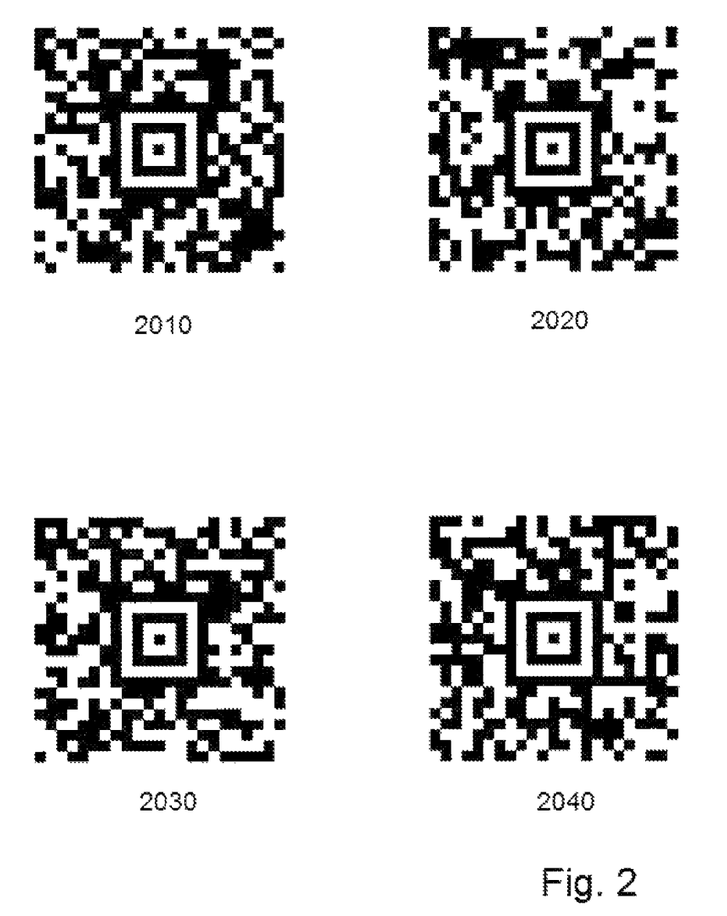
FIG. 2 illustrates an example of multi-symbol bar code sequence which can be displayed by a mobile communication terminal.

In a further aspect, various encodings supporting the structured append feature can be utilized by a mobile communication terminal, for example, Aztec Code, Data Matrix, etc. FIG. 2 illustrates an example of multi-symbol bar code sequence comprising four symbols 2010, 2020, 2030, and 2040 which can be displayed by a mobile communication terminal.

In one embodiment, the employed encoding can be compliant with *AIM Inc. International Technical Specification— Extended Channel Interpretations Part* 1 which uses FNC2 special character to designate Structured Append: if FNC2 special character is found in the final data position, then the preceding two characters can designate, using either numbers of letters, the ordinal number of the message in a multi-message sequence, and the total number of messages in the sequence (also referred to as a "Symbol M of N" indicator).

The multi-symbol sequence can be stored in a file using a standard format (e.g., animated GIF, Flash (SWF), or Windows Movie (WMV)). A skilled artisan would appreciate the fact that other standard or proprietary file formats suitable for storing a sequence of symbol images are within the scope of this disclosure.

Figure 3A:
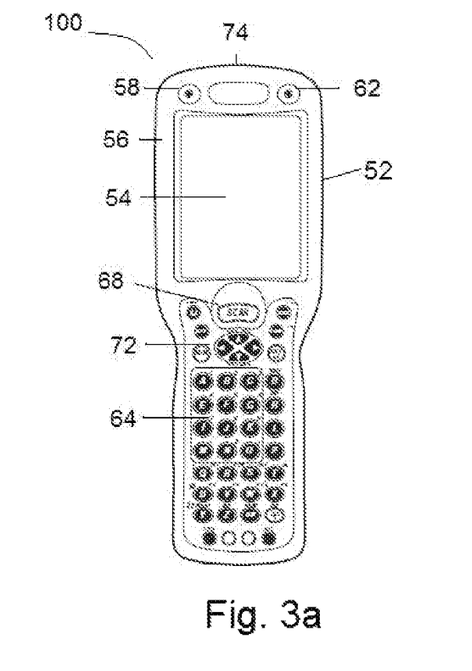
FIGS. 3a-3c schematically illustrate one embodiment of a mobile communication terminal described herein.
Figure 3B:
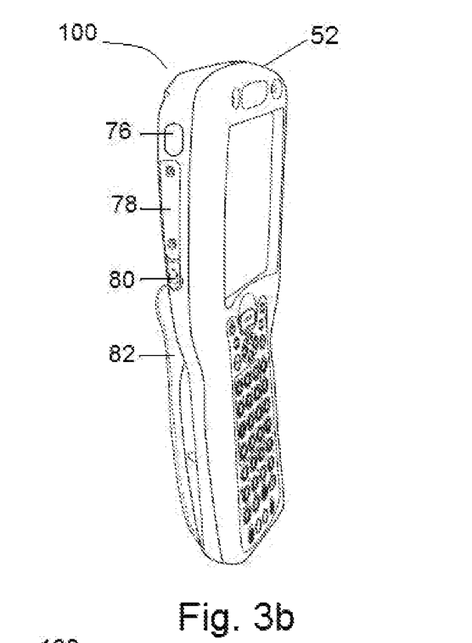
Figure 3C:
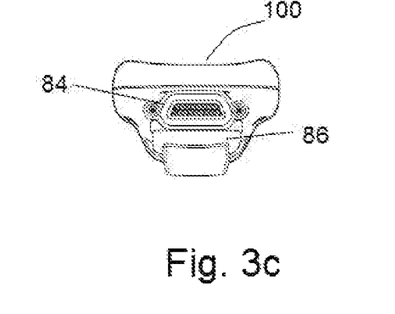

One embodiment of the disclosed mobile communication terminal is shown in in FIGS. 3*a* (front panel view), 3*b* (side panel view), and 3*c* (bottom panel view). The mobile communication terminal 100 can comprise a housing 52 within which other components of mobile communication terminal 100 can be disposed. A display 54 can be disposed on the front panel 56. Also disposed on the front panel 56 can be a decode LED 58, a scan LED 62, and a keyboard 64 including a scan key 68 and navigation keys 72. An imaging window 74 can be disposed on the top panel of the housing 52. Disposed on the side panel (best viewed in FIG. 3*b*) can be an infra-red communication port 76, an access door to a secure digital (SD) memory interface 78, an audio jack 80, and a hand strap 82. Disposed on the bottom panel (best viewed in FIG. 3*c*) can be a multi-pin mechanical connector 84 and a hand strap clip 86. A skilled artisan would appreciate the fact that other types and form factors of mobile communication terminal housings are within the scope of this disclosure.

Figure 4:
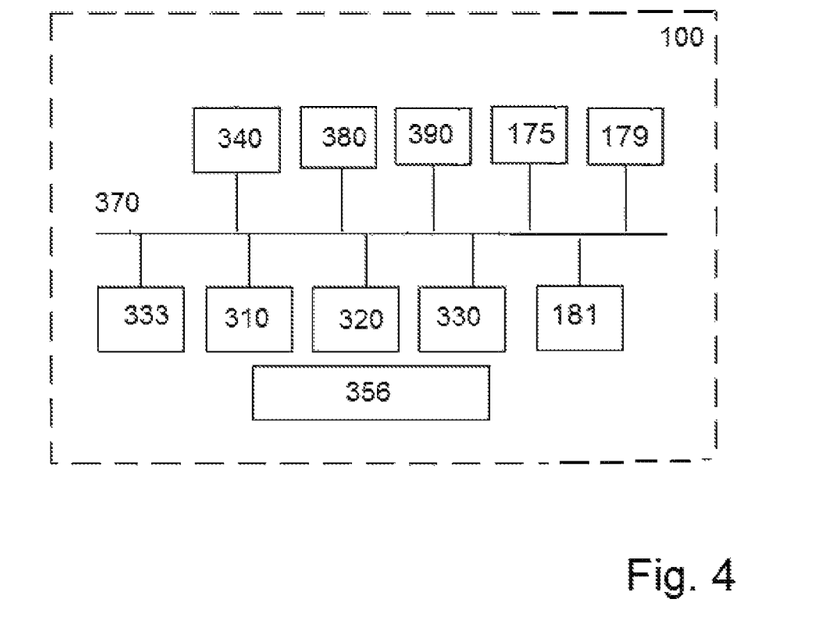
FIG. 4 depicts a component-level layout of a mobile communication terminal described herein.

Component-level diagram of one embodiment of a mobile communication terminal is now being described with references to FIG. 4. The mobile communication terminal 100 can comprise at least one microprocessor 310 and a memory 320, both coupled to the system bus 370. The microprocessor 310 can be provided by a general purpose microprocessor or by a specialized microprocessor (e.g., an ASIC). In one embodiment, mobile communication terminal 100 can comprise a single microprocessor which can be referred to as a central processing unit (CPU). In another embodiment, mobile communication terminal 100 can comprise two or more microprocessors, for example, a CPU providing some or most of a mobile communication terminal functionality and a specialized microprocessor performing some specific functionality. A skilled artisan would appreciate the fact that other schemes of processing tasks distribution among two or more microprocessors are within the scope of this disclosure.

Mobile communication terminal 100 can further comprise a communication interface 340 communicatively coupled to the system bus 370. In one embodiment, the communication interface can be provided by a wireless communication interface. The wireless communication interface can be configured to support, for example, but not limited to, the following protocols: at least one protocol of the IEEE 802.11/802.15/802.16 protocol family, at least one protocol of the HSPA/GSM/GPRS/EDGE protocol family, TDMA protocol, UMTS protocol, LTE protocol, and/or at least one protocol of the CDMA/1xEV-DO protocol family.

Mobile communication terminal 100 can further comprise a battery 356. In one embodiment, the battery 356 can be provided by a replaceable rechargeable battery pack. The mobile communication terminal 100 can further comprise a GPS receiver 380. The mobile communication terminal 100 can further comprise at least one connector 390 configured to receive a subscriber identity module (SIM) card.

Mobile communication terminal 100 can further comprise an imaging device 330, provided, for example, by a two-dimensional imager. In some embodiments, a mobile communication terminal 100 can further comprise a graphical user interface including a display adapter 175 and a keyboard 179. In some embodiments, a mobile communication terminal 100 can further comprise an audio output device, e.g., a speaker 181.

In some embodiments, mobile communication terminal 100 can further comprise an EIR device 333. The EIR device can be provided, for example, by a bar code reading device, an RFID reading device, and/or a card reading device. The EIR device can be configured to output raw message data containing an encoded message and/or output decoded message data corresponding to an encoded message. As used herein, "message" is intended to denote a byte sequence or a character string comprising alphanumeric and/or non-alphanumeric characters. An encoded message can be used to convey information, such as identification of the source and the model of an item, for example, in a UPC code.

In a further aspect, a mobile communication terminal 100 can be incorporated in a data processing system. One embodiment of the data processing system, schematically shown in FIG. 5, can include a plurality of mobile communication terminals 100a-100z in communication with a plurality of interconnected networks 110a-110z. Mobile communication terminal 100 (provided by one of mobile communication terminals 100a-100z) can establish a communication session with one or more external computers 171a-171b. In one embodiment, network frames can be exchanged by a mobile communication terminal 100 and the external computer 171b via one or more routers 140, wireless access points 135, GSM base stations 137, and/or other infrastructure elements. In another embodiment, the external computer 171a can be reachable by a mobile communication terminal 100 via a local area network (LAN). In a yet another embodiment, the external computer 171b can be reachable by a mobile communication terminal 100 via a wide area network (WAN). In a yet another embodiment, the external computer 171a or 171b can be reachable by a mobile communication terminal 100 directly (e.g., via a wired or wireless interface). A skilled artisan would appreciate the fact that other methods of providing interconnectivity between a mobile communication terminal 100 and the external computer 171a or 171b relying upon LANs, WANs, virtual private networks (VPNs), and/or other types of network are within the scope of this disclosure.

A "computer" herein shall refer to a programmable device for data processing and control, including a central processing unit (CPU), a memory, and at least one communication interface. For example, in one embodiment, a computer can be provided by a server running a single instance of a multi-tasking operating system. In another embodiment, a computer can be provided by a virtual server, i.e., an isolated instance of a guest operating system running within a host operating system. A "network" herein shall refer to a set of hardware and software components implementing a plurality of communication channels between two or more computers. A network can be provided, e.g., by a local area network (LAN), or a wide area network (WAN). While different networks can be designated herein, it is recognized that a single network as seen from the application layer interface to the network layer of the OSI model can comprise a plurality of lower layer networks, i.e., what can be regarded as a single Internet Protocol (IP) network, can include a plurality of different physical networks.

Figure 5:
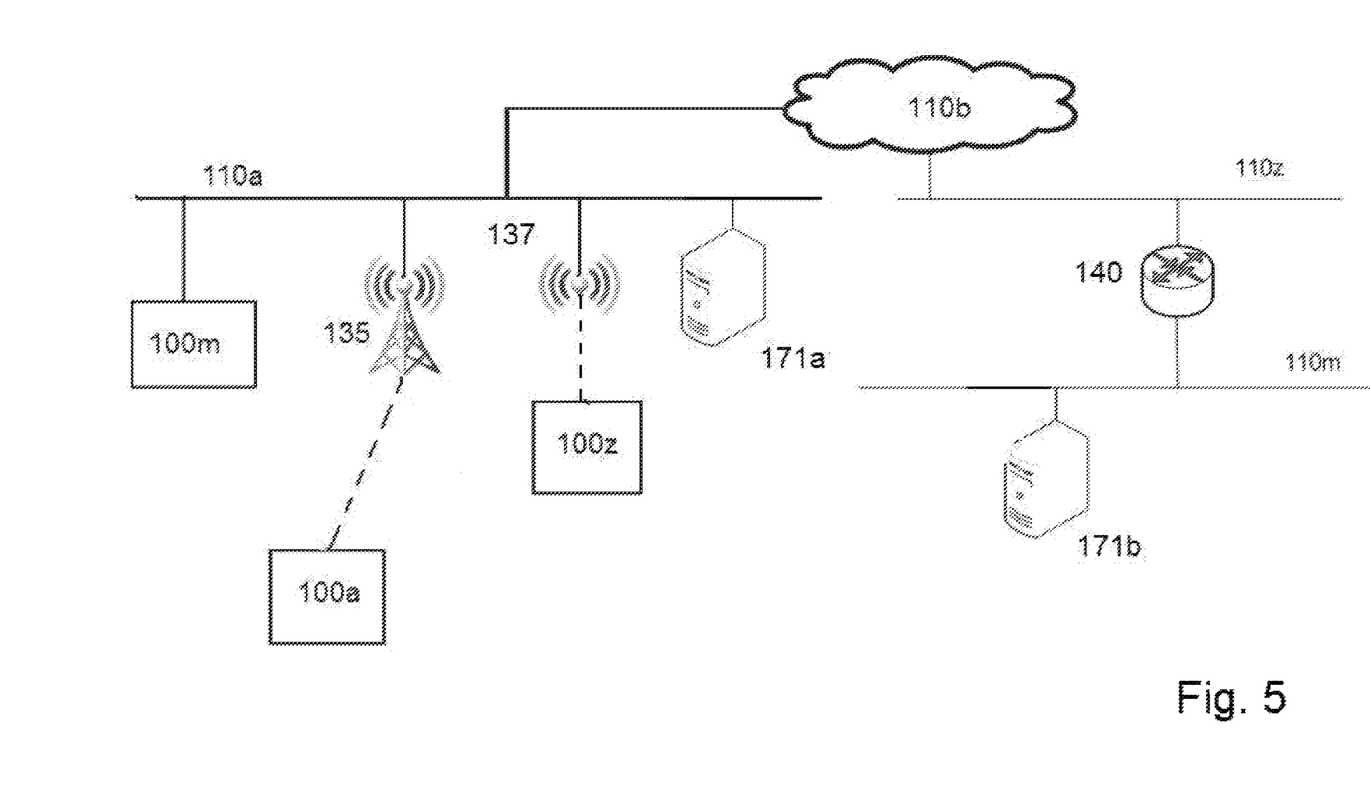
FIG. 5 depicts a network-level layout of a data collection system utilizing mobile communication terminals.

In one embodiment, the communications between a mobile communication terminal 100 and the external computer 171a or 171b can comprise a series of HTTP requests and responses transmitted over one or more TCP connections. A skilled artisan would appreciate the fact that other transport and application level protocols are within the scope and the spirit of the invention.

In a further aspect, at least one of the messages received by a mobile communication terminal 100 can include a byte sequence representing an image of decodable indicia (e.g., a bar code) which a mobile communication terminal can display on the display 54. In another embodiment, at least one of the messages received by a mobile communication terminal 100 can include a byte sequence which a mobile communication terminal 100 can encode into decodable indicia (e.g., a bar code) and the display on the display 54.

As noted herein supra, in order to increase the readability of displayed decodable indicia, a mobile communication terminal 100 can in one embodiment be configured to encode the byte sequence (representing, e.g., a content of an airline boarding pass, a coupon, or a loyalty program card) into one or more bar code symbols with X-dimension equaling or exceeding a readability threshold value.

In another embodiment, responsive to receiving an image of decodable indicia to be displayed, a mobile communication terminal 100 can be configured to determine the X-dimension of the decodable indicia. Responsive to establishing that the determined X-dimension is less than a readability threshold value, a mobile communication terminal can decode the indicia into a character string containing one or more alphanumeric or non-alphanumeric characters and then re-encode the character string into one or more bar code symbols having an X dimension equaling or exceeding the readability threshold value.

In a further aspect, a mobile communication terminal 100 can be configured to detect an attempt of a software module being executed by the terminal to display an image of the decodable indicia. In one embodiment, the display driver executed by a mobile communication terminal can be configured to detect a transfer to its video memory of a byte sequence representing an image of decodable indicia.

A "driver" herein shall refer to a software module allowing other software modules to interact with a hardware device (for example, a keyboard, a display, a printer, etc.). A driver can communicate with the device via the system bus and/or via one or more I/O ports. A driver can also provide handing of one or more hardware interrupts generated by the device. A display driver can read/write to and from one or more blocks of memory associated with the display, which can be referred to as video memory. In a further aspect, the video memory can be configured to store a plurality of color values corresponding to a plurality of pixels displayed by the display.

Responsive to detecting the transfer, the display driver can invoke a software module determining the X-dimension of the decodable indicia the image of which is being transferred to the video memory. Responsive to establishing that the determined X-dimension is less than a readability threshold value, the software module can decode the indicia into a character string containing one or more alphanumeric or non-alphanumeric characters and then re-encode the character string into one or more bar code symbols having an X dimension equaling or exceeding the readability threshold value. The bar code symbols can then be displayed by a mobile communication terminal. For further increasing the readability when more than one bar code symbol is generated as a sequence, the sequence of bar code symbols can be displayed repeatedly for a pre-defined period of time or a pre-defined number of cycles.

Invoking the above described readability increasing functionality responsive to detecting a video memory transfer can be particularly useful if a mobile communication terminal allows executing third-party software modules, which can be oblivious with respect to the above described readability increasing functionality.

In a yet another embodiment, the mobile communication terminal can detect receiving via a communication interface (e.g., a wireless communication interface) a byte sequence comprising an image of decodable indicia to be displayed.

In a yet another embodiment, the mobile communication terminal can comprise a software module configured to display decodable indicia. The software module can be configured, responsive to receiving a byte sequence representing an image of decodable indicia, to determine the X-dimension of the decodable indicia the image of which is being transferred to the video memory. Responsive to establishing that the determined X-dimension is less than a readability threshold value, the software module can decode the indicia into a character string containing one or more alphanumeric or non-alphanumeric characters and then re-encode the character string into one or more bar code symbols having an X dimension equaling or exceeding the readability threshold value. The bar code symbols can then be displayed by a mobile communication terminal. For further increasing the readability when more than one bar code symbol is generated as a sequence, the sequence of bar code symbols can be displayed repeatedly for a pre-defined period of time or a pre-defined number of cycles. In a further aspect, the above described functionality can be implemented by one or more software modules which, in one embodiment, can be a part of a published API available for third-party application developers.

In a yet another embodiment, a mobile communication terminal can comprise a software module configured to display decodable indicia. The software module can be configured, responsive to receiving a byte sequence representing a character string comprising one or more alphanumeric or non-alphanumeric characters, to encode the character string into one or more bar code symbols having an X dimension equaling or exceeding the readability threshold value. The bar code symbols can then be displayed by a mobile communication terminal. In a further aspect, the above described functionality can be implemented by one or more software modules which, in one embodiment, can be a part of a published API available for third-party application developers.

As noted herein supra, the symbols of the multi-symbol sequence can be displayed by a mobile communication terminal. The time of displaying one symbol or the number of symbols displayed in a unit of time can be a user-configurable parameter. In one embodiment, the symbols can be displayed in the order of M number of the M×N indicator. Alternatively, the symbols can be displayed in an arbitrary chosen order or in a random sequence. For further increasing the readability, the sequence of bar code symbols can be displayed repeatedly for a pre-defined period of time or a pre-defined number of cycles.

In a further aspect, one or more configurable parameters can be associated with one or more of the above described functions, for example, the minimum X-dimension (readability threshold) value, the time of displaying one symbol or the number of symbols displayed in a unit of time, and/or the period of time for repeatedly displaying the sequence of bar codes or the number of cycles for repeatedly displaying the sequence of bar codes. In one embodiment, one or more parameters can be configurable by a user of a mobile communication terminal.

In some embodiments, the readability threshold value can be determined by mobile communication terminal based on, e.g., the pixel resolution of the display, the battery charge level, the color of the decodable indicia, and/or other parameters.

Figure 6:
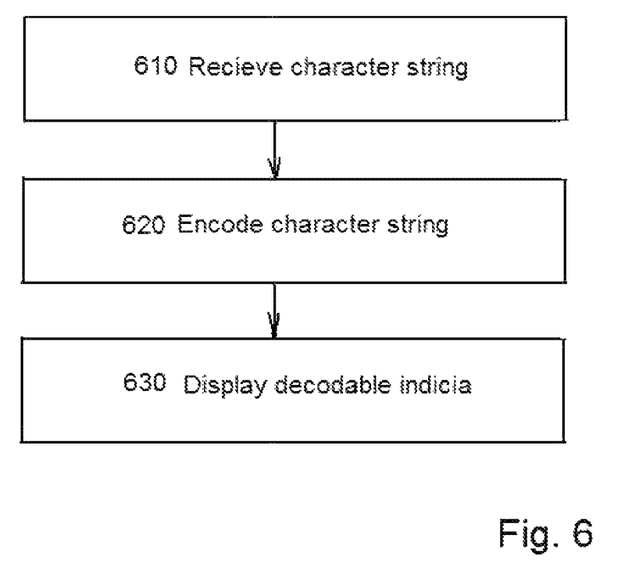
FIGS. 6-7 depict flowcharts of illustrative embodiments of a method of displaying decodable indicia by a mobile communication terminal.

One illustrative embodiment of a method of displaying decodable indicia by a decodable indicia displaying process executed by a mobile communication terminal is now being described with references to FIG. 6.

Processing commences by the decodable indicia displaying process receiving, at block 610, a character string containing one or more alphanumeric or non-alphanumeric characters. In one embodiment, the decodable indicia displaying process can receive a pointer to a memory buffer containing the character string. In one embodiment, the decodable indicia displaying process can allocate a memory buffer for the invoking process copying the character string. A skilled artisan would appreciate the fact that other methods of the decodable indicia displaying process receiving a character string are within the scope of this disclosure.

At step 620, the decodable indicia displaying process can encode the character string into one or more bar code symbols having the minimum dimension of a smallest element equaling or exceeding a readability threshold value.

At step 630, the decodable indicia displaying process can display the bar code symbols. In one embodiment, for further increasing the readability when more than one bar code symbol is generated as a sequence, the sequence of bar code symbols can be displayed repeatedly for a pre-defined period of time or a pre-defined number of cycles.

Upon completing operations described in block 630, the decodable indicia displaying process can terminate.

Figure 7:
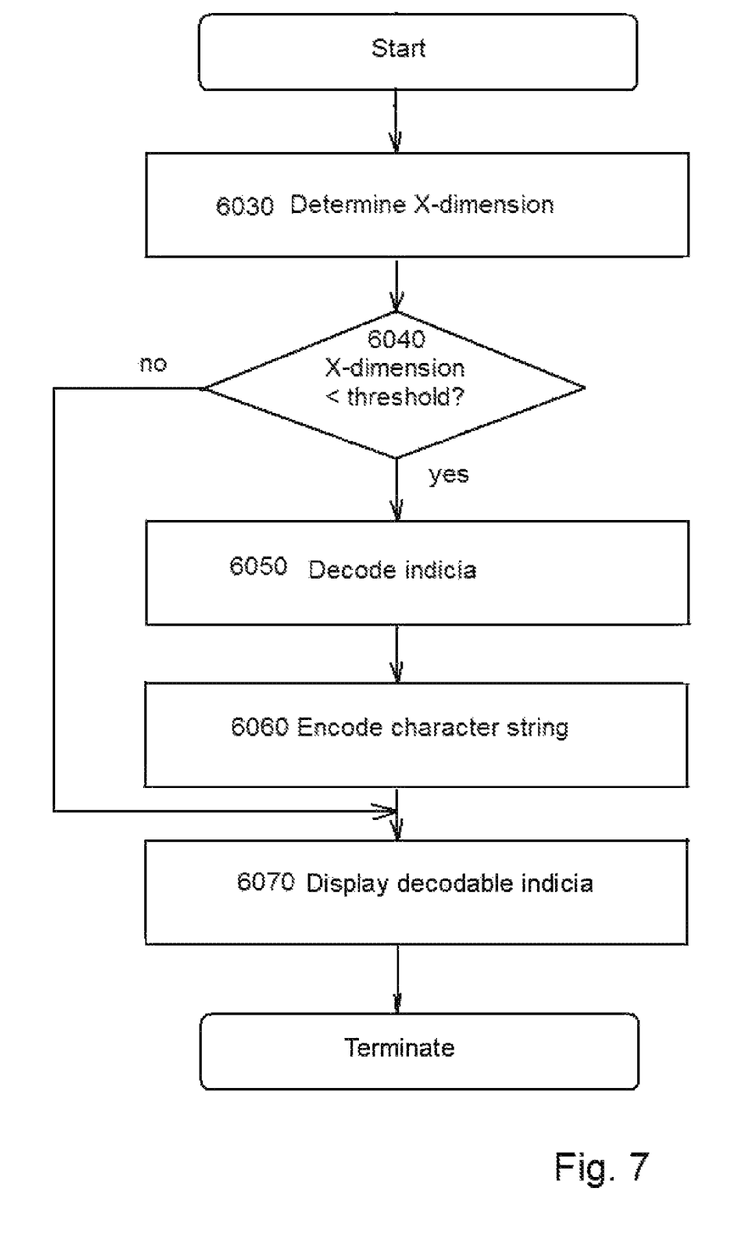

Another illustrative embodiment of a method of displaying decodable indicia by a decodable indicia displaying process executed by a mobile communication terminal is now being described with references to FIG. 7. A "process" herein shall refer to an instance of a computer program that is being executed; in some operating systems, several processes can be instantiated simultaneously. In some operating systems, several processes can be executed concurrently. In some operating systems, several processes can be instantiated simultaneously from the same computer program.

In one embodiment, the method described herein can be invoked by a mobile communication terminal responsive to detecting a byte sequence representing an image of decodable indicia being transferred to the mobile communication terminal via a communication interface (e.g., a wireless communication interface). In a further aspect, the detection of a byte sequence representing an image of decodable indicia being transferred to the mobile communication terminal via a communication interface can be implemented by an interrupt servicing routine (ISR) handling the communication interface. Alternatively, the detection a byte sequence representing an image of decodable indicia being transferred to the mobile communication terminal via a communication interface can be implemented by an interrupt servicing routine (ISR) handling direct memory access (DMA) interrupts. A skilled artisan would appreciate the fact that other methods of detecting a byte sequence representing an image of decodable indicia being transferred to the mobile communication terminal via a communication interface are within the scope of this disclosure.

In another embodiment, the method described herein can be invoked responsive to detecting a byte sequence representing an image of decodable indicia being transferred to the video memory of the mobile communication terminal. In a further aspect, the detection of video memory transfer can be implemented by an interrupt servicing routine (ISR) handling the video memory access interrupts. Alternatively, the detection of video memory transfer can be implemented by an interrupt servicing routine (ISR) handling direct memory access (DMA) interrupts. A skilled artisan would appreciate the fact that other methods of detecting a transfer to the video memory of a byte sequence representing an image of decodable indicia are within the scope of this disclosure.

Processing can commence at step 6030, wherein the mobile communication terminal can determine the minimum dimension of a smallest element (e.g., X-dimension of the bar code symbols) of the decodable indicia image of which is being transferred to video memory.

Responsive to ascertaining at step 6040 that the minimum dimension of the smallest element of the decodable indicia is less than a readability threshold value, the processing can continue at step 6050; otherwise, the processing can continue at step 6070.

At step 6050, the mobile communication terminal can decode the decodable indicia into a character string containing one or more alphanumeric or non-alphanumeric characters.

At step 6060, the mobile communication terminal can encode the character string into one or more bar code symbols having the minimum dimension of a smallest element equaling or exceeding the readability threshold value.

At step 6070, the mobile communication terminal can display the bar code symbols. In one embodiment, for further increasing the readability when more than one bar code symbol is generated as a sequence, the sequence of bar code symbols can be displayed repeatedly either indefinitely, or for a pre-defined period of time or for a pre-defined number of cycles.

Upon completing operations described in block 6070, the decodable indicia displaying process can terminate.

While the present invention has been particularly shown and described with reference to certain exemplary embodiments, it will be understood by one skilled in the art that various changes in detail may be affected therein without departing from the spirit and scope of the invention as defined by claims that can be supported by the written description and drawings. Further, where exemplary embodiments are described with reference to a certain number of elements it will be understood that the exemplary embodiments can be practiced utilizing less than the certain number of elements.

A small sample of systems, methods, and apparata that are described herein is as follows:

A1. A mobile communication terminal comprising:
a housing;
a microprocessor disposed within said housing;
a display incorporated into said housing;
a communication interface communicatively coupled to said microprocessor, said communication interface at least partially disposed within said housing;
wherein said mobile communication terminal is configured, responsive to receiving a byte sequence representing a character string containing one or more alphanumeric or non-alphanumeric characters, to encode said byte sequence into one or more bar code symbols having a minimum dimension of a smallest element equaling or exceeding a readability threshold value; and
wherein said mobile communication terminal is further configured to display said one or more bar code symbols.

A2. The mobile communication terminal of (A1), wherein said one or more bar code symbols is provided by a multi-symbol sequence; and
wherein at least one bar code symbol includes an indicator of an ordinal number of said bar code symbol in said multi-symbol sequence.

A3. The mobile communication terminal of (A1), wherein said one or more of bar code symbols is provided by a multi-symbol sequence; and
wherein said mobile communication terminal is further configured to repeatedly display said multi-symbol sequence for one of: a pre-defined period of time, a pre-defined number of cycles.

A4. The mobile communication terminal of (A1), further configured to accept a user input selecting said readability threshold value.

A5. The mobile communication terminal of (A1), further configured to determine said readability threshold value prior to encoding said byte sequence into said one or more bar code symbols.

A6. The mobile communication terminal of (A1), further configured to determine said readability threshold value based on at least one of: a pixel resolution of said display, a battery charge level, a color scheme of said decodable indicia.

A7. The mobile communication terminal of (A1), further comprising an encoded information reading (EIR) device selected from the group consisting of: a bar code reading device, an RFID reading device, and a card reading device;
wherein said EIR device is configured to perform at least one of: outputting raw message data containing an encoded message and outputting decoded message data corresponding to an encoded message.

A8. The mobile communication terminal of (A1), wherein said mobile communication terminal is provided by one of: an EIR terminal, a smart phone, a mobile phone, and a personal digital assistant (PDA).

A9. The mobile communication terminal of (A1), wherein said communication interface is provided by a wireless communication interface.

B1. A mobile communication terminal comprising:
a housing;
a microprocessor disposed within said housing;
a display incorporated into said housing;
a communication interface communicatively coupled to said microprocessor, said communication interface at least partially disposed within said housing;
wherein said mobile communication terminal is configured, responsive to receiving a byte sequence representing an image of decodable indicia, to determine a minimum dimension of a smallest element of said decodable indicia;
wherein said mobile communication terminal is further configured, responsive to ascertaining that said minimum dimension is less than a readability threshold value, to decode said decodable indicia into a character string containing one or more alphanumeric or non-alphanumeric characters and encode said character string into one or more bar code symbols having a minimum dimension of a smallest element equaling or exceeding said readability threshold value; and
wherein said mobile communication terminal is further configured to display said one or more bar code symbols on said display.

B2. The mobile communication terminal of (B1), wherein said one or more bar code symbols is provided by a multi-symbol sequence; and
wherein at least one bar code symbol includes an indicator of an ordinal number of said bar code symbol in said multi-symbol sequence.

B3. The mobile communication terminal of (B1), wherein said one or more of bar code symbols is provided by a multi-symbol sequence; and
wherein said mobile communication terminal is further configured to repeatedly display said multi-symbol sequence for one of: a pre-defined period of time, a pre-defined number of cycles.

B4. The mobile communication terminal of (B1), further configured to accept a user input selecting said readability threshold value.

B5. The mobile communication terminal of (B1), further configured to determine said readability threshold value prior to encoding said byte sequence into said one or more bar code symbols.

B6. The mobile communication terminal of (B1), further configured to determine said readability threshold value based on at least one of: a pixel resolution of said display, a battery charge level, a color scheme of said decodable indicia.

B7. The mobile communication terminal of (B1), further comprising an encoded information reading (EIR) device selected from the group consisting of: a bar code reading device, an RFID reading device, and a card reading device;

wherein said EIR device is configured to perform at least one of: outputting raw message data containing an encoded message and outputting decoded message data corresponding to an encoded message.

B8. The mobile communication terminal of (B1), wherein said mobile communication terminal is provided by one of: an EIR terminal, a smart phone, a mobile phone, and a personal digital assistant (PDA).

B9. The mobile communication terminal of (B1), wherein said communication interface is provided by a wireless communication interface.

C1. A mobile communication terminal comprising:
a housing;
a microprocessor disposed within said housing;
a display incorporated into said housing;
a display adapter communicatively coupled to said microprocessor, said display adapter configured to control said display;
a video memory communicatively coupled to said display adapter, said video memory configured to store data representing images displayed by said display; and
a communication interface communicatively coupled to said microprocessor, said communication interface at least partially disposed within said housing;
wherein said mobile communication terminal is configured, responsive to detecting a byte sequence representing an image of decodable indicia being transferred to said video memory, to determine a minimum dimension of a smallest element of said decodable indicia;
wherein said mobile communication terminal is further configured, responsive to ascertaining that said minimum dimension is less than a readability threshold value, to decode said decodable indicia into a character string containing one or more alphanumeric or non-alphanumeric characters and encode said character string into one or more bar code symbols having a minimum dimension of a smallest element equaling or exceeding said readability threshold value; and
wherein said mobile communication terminal is further configured to display said one or more bar code symbols on said display.

C2. The mobile communication terminal of (C1), wherein said video memory is configured to store a plurality of color values corresponding to a plurality of pixels displayed by said display.

C3. The mobile communication terminal of (C1), further configured to receive said byte sequence from an external computer.

C4. The mobile communication terminal of (C1), further configured to generate said byte sequence based on a message received from an external computer.

C5. The mobile communication terminal of (C1), wherein said one or more bar code symbols is provided by a multi-symbol sequence; and
wherein at least one bar code symbol includes an indicator of an ordinal number of said bar code symbol in said multi-symbol sequence.

C6. The mobile communication terminal of (C1), wherein said one or more of bar code symbols is provided by a multi-symbol sequence; and
wherein said mobile communication terminal is further configured to repeatedly display said multi-symbol sequence for one of: a pre-defined period of time, a pre-defined number of cycles.

C7. The mobile communication terminal of (C1), further configured to accept a user input selecting said readability threshold value.

C8. The mobile communication terminal of (C1), further configured to determine said readability threshold value prior to encoding said byte sequence into said one or more bar code symbols.

C9. The mobile communication terminal of (C1), further configured to determine said readability threshold value based on at least one of: a pixel resolution of said display, a battery charge level, a color scheme of said decodable indicia.

C10. The mobile communication terminal of (C1), further comprising an encoded information reading (EIR) device selected from the group consisting of: a bar code reading device, an RFID reading device, and a card reading device;
wherein said EIR device is configured to perform at least one of: outputting raw message data containing an encoded message and outputting decoded message data corresponding to an encoded message.

C11. The mobile communication terminal of (C1), wherein said mobile communication terminal is provided by one of: an EIR terminal, a smart phone, a mobile phone, and a personal digital assistant (PDA).

C12. The mobile communication terminal of (C1), wherein said communication interface is provided by a wireless communication interface.

D1. A method of displaying decodable indicia by a mobile communication terminal, said method comprising the steps of:
receiving a character string containing one or more alphanumeric or non-alphanumeric characters;
encoding said character string into one or more bar code symbols having a minimum dimension of a smallest element equaling or exceeding a readability threshold value; and
displaying said one or more bar code symbols.

D2. The method of (D1), further comprising the step of accepting a user input selecting said readability threshold value.

D3. The method of (D1), further comprising the step of, further comprising the step of determining said readability threshold value prior to said step of encoding said byte sequence into said one or more bar code symbols.

D4. The method of (D1), wherein said one or more bar code symbols is provided by a multi-symbol sequence; and
wherein at least one bar code symbol includes an indicator of an ordinal number of said bar code symbol in said multi-symbol sequence.

D5. The method of (D1), wherein said one or more of bar code symbols is provided by a multi-symbol sequence; and
wherein said step of displaying comprises repeatedly displaying said multi-symbol sequence for one of: a pre-defined period of time, a pre-defined number of cycles.

E1. A method of displaying decodable indicia by a mobile communication terminal, said method comprising the steps of:
determining a minimum dimension of a smallest element of said decodable indicia;
responsive to ascertaining that said minimum dimension is less than a pre-defined readability threshold value, decoding said decodable indicia into a character string containing one or more alphanumeric or non-alphanumeric characters;
encoding said character string into one or more bar code symbols having a minimum dimension of a smallest element equaling or exceeding said pre-defined readability threshold value; and
displaying said one or more bar code symbols.

E2. The method of (E1), further comprising the step of accepting a user input selecting said readability threshold value.

E3. The method of (E1), further comprising the step of, further comprising the step of determining said readability threshold value prior to said step of encoding said byte sequence into said one or more bar code symbols.

E4. The method of (E1), wherein said one or more bar code symbols is provided by a multi-symbol sequence; and wherein at least one bar code symbol includes an indicator of an ordinal number of said bar code symbol in said multi-symbol sequence.

E5. The method of (E1), wherein said one or more of bar code symbols is provided by a multi-symbol sequence; and wherein said step of displaying comprises repeatedly displaying said multi-symbol sequence for one of: a pre-defined period of time, a pre-defined number of cycles.

The invention claimed is:

1. A mobile communication terminal comprising:
    a housing;
    a microprocessor disposed within said housing;
    a display incorporated into said housing;
    a communication interface communicatively coupled to said microprocessor, said communication interface at least partially disposed within said housing;
    wherein said mobile communication terminal is configured, responsive to receiving a byte sequence representing a character string containing one or more alphanumeric or non-alphanumeric characters, to encode said byte sequence into one or more bar code symbols having a bar code X-dimension equaling or exceeding a bar code X-dimension threshold value;
    wherein said mobile communication terminal is configured to display said one or more bar code symbols; and
    wherein said mobile communication terminal is further configured to accept a user input selecting said bar code X-dimension threshold value.

2. The mobile communication terminal of claim 1, wherein said one or more bar code symbols is provided by a multi-symbol sequence; and
    wherein at least one bar code symbol includes an indicator of an ordinal number of said bar code symbol in said multi-symbol sequence.

3. The mobile communication terminal of claim 1, wherein said one or more of bar code symbols is provided by a multi-symbol sequence; and
    wherein said mobile communication terminal is further configured to repeatedly display said multi-symbol sequence for one of: a pre-defined period of time, a pre-defined number of cycles.

4. The mobile communication terminal of claim 1, further configured to determine said readability threshold value prior to encoding said byte sequence into said one or more bar code symbols.

5. The mobile communication terminal of claim 1, further configured to determine said readability threshold value based on at least one of: a pixel resolution of said display, a battery charge level, a color scheme of said decodable indicia.

6. The mobile communication terminal of claim 1, further comprising an encoded information reading (EIR) device selected from the group consisting of: a bar code reading device, an RFID reading device, and a card reading device;
    wherein said EIR device is configured to perform at least one of: outputting raw message data containing an encoded message and outputting decoded message data corresponding to an encoded message.

7. The mobile communication terminal of claim 1, wherein said mobile communication terminal is provided by one of: an EIR terminal, a smart phone, a mobile phone, and a personal digital assistant (PDA).

8. The mobile communication terminal of claim 1, wherein said communication interface is provided by a wireless communication interface.

9. A mobile communication terminal comprising:
    a housing;
    a microprocessor disposed within said housing;
    a display incorporated into said housing;
    a display adapter communicatively coupled to said microprocessor, said display adapter configured to control said display;
    a video memory communicatively coupled to said display adapter, said video memory configured to store data representing images displayed by said display; and
    a communication interface communicatively coupled to said microprocessor, said communication interface at least partially disposed within said housing;
    wherein said mobile communication terminal is configured, responsive to detecting a byte sequence representing an image of decodable indicia being transferred to said video memory, to determine a bar code X-dimension of said decodable indicia;
    wherein said mobile communication terminal is further configured, responsive to ascertaining that said bar code X-dimension is less than a bar code X-dimension threshold value, to decode said decodable indicia into a character string containing one or more alphanumeric or non-alphanumeric characters and encode said character string into one or more bar code symbols having a bar code X-dimension equaling or exceeding said bar code X-dimension threshold value; and
    wherein said mobile communication terminal is further configured to display said one or more bar code symbols on said display.

10. The mobile communication terminal of claim 9, wherein said video memory is configured to store a plurality of color values corresponding to a plurality of pixels displayed by said display.

11. The mobile communication terminal of claim 9, further configured to receive said byte sequence from an external computer.

12. The mobile communication terminal of claim 9, further configured to generate said byte sequence based on a message received from an external computer.

* * * * *